United States Patent [19]

Brinkmann et al.

[11] 4,071,506
[45] Jan. 31, 1978

[54] CRYSTAL-CLEAR POLYAMIDES FROM 1,3-BIS(AMINOMETHYL)CYCLOHEXANE

[75] Inventors: Ludwig Brinkmann, Frankfurt am Main; Lothar Bohn, Glashutten, Taunus, both of Germany

[73] Assignee: Hoechst Aktiengesellschaft, Frankfurt am Main, Germany

[21] Appl. No.: 578,918

[22] Filed: May 19, 1975

Related U.S. Application Data

[63] Continuation-in-part of Ser. No. 439,878, Feb. 6, 1974, abandoned, which is a continuation-in-part of Ser. No. 366,311, June 4, 1973, abandoned, which is a continuation of Ser. No. 206,138, Dec. 8, 1971, abandoned.

[30] Foreign Application Priority Data

Dec. 10, 1970  Germany .............................. 2060704

[51] Int. Cl.$^2$ ....................... C08G 69/08; C08G 69/14
[52] U.S. Cl. ............... 260/78 A; 260/33.4 R; 260/78 L
[58] Field of Search ...................... 260/78 A

[56] References Cited

U.S. PATENT DOCUMENTS

| 2,985,626 | 5/1961 | Caldwell et al. | 260/78 |
| 2,985,627 | 5/1961 | Caldwell et al. | 260/78 |
| 3,012,994 | 12/1961 | Bell et al. | 260/78 |
| 3,787,371 | 1/1974 | Brinkmann et al. | 260/78 |
| 3,839,121 | 10/1974 | Schmitt et al. | 260/78 A |
| 3,875,129 | 4/1975 | Herwig et al. | 260/78 A |

FOREIGN PATENT DOCUMENTS

| 776,545 | 6/1972 | Belgium. |
| 26,820 | 4/1972 | Chile. |
| 718,208 | 12/1972 | South Africa. |

*Primary Examiner*—Harold D. Anderson
*Attorney, Agent, or Firm*—Curtis, Morris & Safford

[57] ABSTRACT

There are disclosed and claimed novel polyamides on the basis of a) 1,3-bis-(amino-methyl)-cyclohexane or mixtures thereof with 1,4-bis-(amino-methyl)-cyclohexane; b) one or several aromatic dicarboxylic acid (s); and c) one or several aliphatic amino-carboxylic acid(s); and the process of making the same. These polyamides combine high transparency with very good thermal and mechanical properties, namely high second order transition temperatures, good form stability at higher temperatures, high hardness and impact strength.

5 Claims, No Drawings

CRYSTAL-CLEAR POLYAMIDES FROM 1,3-BIS(AMINOMETHYL)CYCLOHEXANE

This application is a continuation-in-part of our application Ser. No. 439,878 filed Feb. 6, 1974 which is a continuation-in-part of our application Ser. No. 366,311 filed June 4, 1973 which is a continuation of our application Ser. No. 206,138 filed Dec. 8, 1971, all now abandoned.

The present invention relates to crystal-clear polyamides. Polyamides on the basis of aliphatic diamines and aliphatic dicarboxylic acids have been known for decades. According to their composition, these polyamides are either crystalline substances having a high melting point, or amorphous substances having a relatively low second order transition temperature. The crystalline aliphatic polyamides are used in the manufacture of fibers and injection-moulded articles. The amorphous aliphatic polyamides are used in the injection-moulding process. The second order transition temperatures of these amorphous polyamides are too low for many application purposes.

Polyamides made from 1,3-bis-(aminomethyl)-cyclohexane and/or 1,4-bis-(aminomethyl)-cyclohexane as the diamine component(s) have already been known.

For example, in U.S. Pat. Nos. 2,985,626 and 3,012,994 there are disclosed several polyamides on the basis of the said diamines. Most of the known polyamides are partly crystalline, and, therefore, more or less opaque.

Example 1 of U.S. Pat. No. 2,985,626 describes the making of a polyamide from 1,4-bis-(aminomethyl)-cyclohexane, terephthalic acid and ε-caprolactam. This polyamide, though being transparent, shows no form stability at higher temperatures.

Example 10 of U.S. Pat. No. 3,012,994 discloses the preparation of a transparent polyamide from 1,4-bis-(aminomethyl)-cyclohexane and a mixture of terephthalic and isophthalic acids. This polyamide, though showing good form stability at higher temperatures, is characterized by an only poor impact strength.

Mixtures of 1,3-bis-(aminomethyl)-cyclohexane and 1,4-bis-(aminomethyl)-cyclohexane, too, have already been used for preparing polyamides. Example 29 of U.S. Pat. No. 3,012,994 discloses the making of a polyamide by polycondensation of a mixture of 30 mol percent 1,3-bis-(aminomethyl)-cyclohexane and 70 mol percent 1,4-bis-(aminomethyl)-cyclohexane with adipic acid; this polyamide is partly crystalline and, therefore, opaque. When polycondensing, in correspondence with example 30 of U.S. Pat. No. 3,012,994, an equimolar mixture of 1,3- and 1,4-bis-(aminomethyl)-cyclohexanes with adipic acid, the resulting polyamide, when cooled not too slowly, is transparent, but its form stability at higher temperatures is not satisfactory.

The present invention provides a process for the preparation of crystal-clear polyamides by way of polycondensation of diamines, dicarboxylic acids and amino acids or their lactams in known manner and under common conditions, which comprises using a. 1,3-bis-(amino-methyl)-cyclohexane or mixtures of 1,3-bis-(amino-methyl)-cyclohexane and 1,4-bis-(amino-methyl)-cyclohexane, the proportion of 1,3-bis-(amino-methyl)-cyclohexane being at least 50 mol %, preferably from 90 to 60 mol %, calculated on the total amount of the diamine components, b. one or several aromatic dicarboxylic acid(s) containing from 7 to 20 carbon atoms, preferably from 8 to 14 carbon atoms, in particular mononuclear dicarboxylic acids carrying the carboxylic groups in meta- or para-position, or mixtures of these dicarboxylic acids, and c. one or several aliphatic amino-carboxylic acid(s) containing up to 20 carbon atoms, preferably from 4 to 12 carbon atoms, in particular ω-amino-carboxylic acid(s), or its (their) lactam(s), the proportion of the amino-carboxylic acid(s) or of the lactam(s) being from 5 to 60% by weight, preferably 5 to about 33% by weight, calculated on the total weight of the polyamide.

The diamines 1,3-bis-(amino-methyl)-cyclohexane and 1,4-bis-(amino-methyl)-cyclohexane to be used in accordance with the process of the invention may be obtained by way of hydrogenation of the corresponding xylylene diamines. For the preparation of the crystal-clear polyamides, trans-1,3-bis-(amino-methyl)-cyclohexane and mixtures of trans-1,3-bis-(amino-methyl)-cyclohexane and trans-1,4-bis-(amino-methyl)-cyclohexane are particularly suitable. However, use may also be made of the corresponding cis-diamines or mixtures of cis- and trans-di-amines. In the case of using mixtures of 1,3- and 1,4-bis-(amino-methyl)-cyclohexane, they contain at least 50 mol %, preferably from 90 to 60 mol %, of 1,3-bis-(amino-methyl)-cyclohexane.

As aromatic dicarboxylic acids which are reacted together with amino-carboxylic acids or the corresponding lactams, and with 1,3-bis-(amino-methyl)-cyclohexane or mixtures of 1,3-bis-(amino-methyl)-cyclohexane and 1,4-bis-(amino-methyl)-cyclohexane, there are suitably used those having from 7 to 20 carbon atoms, preferably from 8 to 14 carbon stoms or mixtures of these dicarboxylic acids. Particularly suitable are mononuclear dicarboxylic acids carrying the carboxylic groups in meta- or para-position, above all terephthalic acid, isophthalic acid, or mixtures of terephthalic acid and ispophthalic acid. Further advantageous examples for aromatic dicarboxylic acids to be used according to the invention are 2,5-pyridine-dicarboxylic acid, 4,4'-diphenyl-dicarboxylic acid, 1,4-naphthalene-dicarboxylic acid, 1,5-naphthalene-dicarboxylic acid, 2,6-naphthalene-dicarboxylic acid. Mixtures of these dicarboxylic acids may also be used.

As aliphatic amino-carboxylic acids which are reacted, together with the aromatic dicarboxylic acids, with 1,3-bis-(amino-methyl)-cyclohexane or mixtures of 1,3-bis-(amino-methyl)-cyclohexane and 1,4-bis-(amino-methyl)-cyclohexane, there are suitably used those having up to 20 carbon atoms, preferably from 4 to 12 carbon atoms, in particular ω-amino-carboxylic acids. The use of ε-amino-caproic acid is most advantageous. Furhter advantageous examples of aliphatic amino-carboxylic acids to be used according to the invention are amino-pivalic acid, ω-amino-caprylic acid, ω-amino-undecanoic acid, or ω-amino-dodecanoic acid. Instead of the amino-carboxylic acids, the lactams thereof may also be used.

The polyamides of the invention are prepared in accordance with the known processes which have been developed for the preparation of polyhexamethylene-adipamide and poly-ε-caprolactam. The diamines, di-carboxylic acids and amino-carboxylic acids or their lactams are heated in an autoclave made of stainless steel to a temperature of from about 200° to 250° C, while stirring, optionally, with the addition of water.

The steam is let off, and the temperature is increased to about 260° to 300° C. At this temperature, the mixture is stirred for some time in a nitrogen current. Finally, the autoclave is evacuated, and the reaction mixture is condensed further until the polyamide has reached the desired molecular weight.

The polyamides of the invention are marked by a high transparency, a high impact strength, and good dielectric properties, and are extremely suitable for processing by injection-moulding. It was a surprising fact which could not have been foreseen that the polyamides of the invention are transparent, since it was to be expected — according to the known prior art — that the diamines of the invention yield only crystalline, highmelting polyamides. According to their composition, the polyamides of the invention have a second order transition temperature of up to about 180° C and a reduced specific viscosity of from 1.0 to 2.5 dl/g, preferably from 1.5 to 2.0 dl/g, measured under the conditions specified below. The crystalclear polyamides of the invention are suitable for the manufacture of injection-moulded articles which may also be used within the range of higher temperatures.

The following Examples illustrate the preparation and the properties of the polyamides of the invention in detail.

EXAMPLES

The reduced specific viscosity (RSV) was determined in solutions of 1 g of polyamide in 100 ml of a mixture of phenol/tetrachloroethane (in a weight ratio of 60 : 40) at 25° C. The second order transition temperatures were determined by way of differential thermoanalysis at a heating rate of 4° C per minute.

The ball indentation hardness was measured according to DIN 53 456 at a load of 50 kg, a ball diameter of 5 mm and a measuring time of 10 seconds.

The bending E-modulus was obtained from the bending test according to DIN 53 452, measured with a standard test bar.

The standard test bars (0.4 cm $\times$ 0.6 cm $\times$ 5 cm) used for measuring the ball indentation hardness and for the aforementioned bending test were prepared by injection molding with a screw extruder. The temperatures of the three heating zones of the extruder were 290° C, 280° C and 280° C. The temperatures of the extrusion die and mould were 280° C and 50° C, respectively. The injection pressure was 50 atmospheres gauge.

To determine the toughness properties of the polyamides obtained a fall test was used in experiments 1, 2, 6, 10 and 12. Injection-moulded plates prepared from the polyamides under the above-mentioned molding conditions and having the measurement 6 cm $\times$ 6 cm $\times$ 0.2 cm were placed on a rigid support having a circular bore (diameter: 2.6 cm) in such a way that the centre of each plate was above the centre of the bore. Concentric to the bore a falling body (weight: 940 g) carrying a steel ball (diameter: 0.9 cm) at its lower end was dropped from various heights vertically onto the plate. As a measure of the impact strength there was determined the "mean falling height" in cm which denotes the height from which the falling body must fall onto the plates in order to cause 100% or 50% of them, respectively, to break.

The tests were carried out after the injection-molded plates had been stored for five days in air at 20° C.

EXAMPLE 1

A mixture of 3322 g of terephthalic acid, 1992 g of trans-1,3-bis-(amino-methyl)-cyclohexane, 853 g of trans-1,4-bis-(aminomethyl)-cyclohexane, 1543 g of ε-caprolactam and 800 ml of water was introduced into an autoclave made of stainless steel, the atmospheric oxygen was replaced by nitrogen, the autoclave was sealed and heated to 260° C. The pressure which had risen to 14 kg/cm$^2$ was reduced to atmospheric pressure in the course of 1 hour, and at the same time the temperature was increased to 290° C. At this temperature the reaction mixture was stirred in a current of nitrogen for 75 minutes. A transparent polyamide was obtained. RSV = 1.25 dl/g. The second order transition temperature was 143.5° C. The "mean falling height" (50%) was 110 cm.

EXAMPLE 2

According to the polycondensation process described in example 1, a transparent polyamide was prepared from a mixture of 3322 g of terephthalic acid, 1992 g of trans-1,3-bis-(aminomethyl)-cyclohexane, 853 g of trans-1,4-bis-(aminomethyl)-cyclohexane, 1088 g of ε-caprolactam and 800 ml of water. RSV = 1.54 dl/g. The second order transition temperature, ball indentation hardness, bending E-modulus and "mean falling height" (50%) of the product were 150° C, 1840 kg/cm$^2$, 34 000 kg/cm$^2$ and 115 cm, respectively.

EXAMPLE 3

According to the polycondensation process described in example 1, a crystal-clear polyamide was prepared from a mixture of 1661 g of terephthalic acid, 1661 g of isophthalic acid, 1992 g of trans-1,3-bis-(amino-methyl)-cyclohexane, 853 g of trans-1,4-bis-(amino-methyl)-cyclohexane, 2640 g of ε-caprolactam, and 800 milliliters of water. RSV = 1.72 dl/g. The second order transition temperature of the product was 116° C.

EXAMPLE 4

According to the polycondensation process described in Example 1, a crystal-clear polyamide was prepared from a mixture of 3322 g of ispohthalic acid, 1922 g of trans-1,3-bis-(amino-methyl)-cyclohexane, 853 g of trans-1,4-bis-(amino-methyl)-cyclohexane, 2640 g of ε-caprolactam, and 800 milliliters of water. RSV = 1.78 dl/g. The second order transition temperature, ball indentation hardness and bending E-modulus of the product were 123° C, 1930 kg/cm$^2$ and 33100 kg/cm$^2$, respectively.

A standard test bar (0.4 cm $\times$ 0.6 cm $\times$ 5 cm) was prepared from the polyamide under the above-mentioned molding conditions. The bar was placed with one of the planes measuring 0.6 cm $\times$ 5 cm on two edges located in a distance of 3 cm from each other. Halfway between the edges a hanging weight of 500 g was applied to the test bar. After 5 hours at ambient temperature the test bar showed no visible bent. The whole device was then stored in a drying oven, the interior of which was uniformly heated at 110° C. After 5 hours the test bar showed a bent of only ½ mm.

Comparative tests with test bars prepared from the polyamides obtained in correspondence with example 1 of U.S. Pat. No. 2,985,626 and example 30 of U.S. Pat. No. 3,012,994, respectively, could not be carried out, since at 110° C these test bars were bent under the load of 500 g to such an extent that they fell from the edges.

EXAMPLE 5

According to the polycondensation process described in example 1, a crystal-clear polyamide was prepared from a mixture of 1661 g of terephthalic acid, 1380 g of trans-1,3-bis-(aminomethyl)-cyclohexane, 71 g of trans-1,4-bis-(amino-methyl)-cyclohexane, 655 g of ε-caprolactam and 500 ml of water. RSV = 1.41 dl/g. The second order transition temperature of the product was 165° C.

EXAMPLE 6

According to the polycondensation process described in example 1, a transparent polyamide was prepared from a mixture of 3322 g of terephthalic acid, 2902 g of trans-1,3-bis-(aminomethyl)-cyclohexane, 1816 g of ε-caprolactam and 900 ml of water. RSV = 1.46 dl/g. The second order transition temperature, ball indentation hardness, bending E-modulus and "mean falling height" (50%) of the product were 145° C, 1850 kg/cm², 33100 kg/cm² and 100 cm, respectively.

EXAMPLE 7

According to the polycondensation process described in example 1, a transparent polyamide was prepared from a mixture of 1661 g of terephthalic acid, 1451 g of trans-1,3-bis-(aminomethyl)-cyclohexane, 1170 g of caprolactam and 450 ml of water. RSV = 1.41 dl/g. The second order transition temperature of the product was 134° C.

EXAMPLE 8

According to the polycondensation process described in example 1, a transparent polyamide was prepared from a mixture of 1329 g of terephthalic acid, 332 g of isophthalic acid, 1451 g of trans-1,3-bis-(aminomethyl)-cyclohexane, 655 g of ε-caprolactam and 450 ml of water. RSV = 1.22 dl/g. The second order transition temperature of the product was 160.5° C.

EXAMPLE 9

According to the polycondensation process described in example 1, a transparent polyamide was prepared from a mixture of 1661 g of isophthalic acid, 1451 g of trans-1,3-bis-(amino-methyl)-cyclohexane, 144 g of ε-caprolactam and 450 ml of water. RSV = 1.18 dl/g. The second order transition temperature of the product was 170° C.

EXAMPLE 10

According to the polycondensation process described in example 1, a transparent polyamide was prepared from a mixture of 3322 g of terephthalic acid, 1992 g of trans-1,3-bis-(amino-methyl)-cyclohexane, 853 g of trans-1,4-bis-(aminomethyl)-cyclohexane, and 1684 g of ω-aminododecanoic acid. RSV = 1.50 dl/g. The second order transition temperature, ball indentation hardness, bending E-modulus and "mean falling height" (50%) of the product were 154° C, 1570 kg/cm², 27 800 kg/cm² and 120 cm, respectively.

EXAMPLE 11

According to the polycondensation process described in example 1, a transparent polyamide was prepared from a mixture of 1661 g of terephthalic acid, 1661 g of isophthalic acid, 2904 g of trans-1,3-bis-(amino-methyl)-cyclohexane and 604 g of ε-caprolactam. RSV = 1.05 dl/g. The second order transition temperature of the product was 174° C.

EXAMPLE 12 a. (according to U.S. patent specification 3,012,994 (BELL), example 10)

A mixture of 495 g of terephthalic acid, 1960 g of isophthalic acid, 2130 g of trans-1,4-bis-(aminomethyl)-cyclohexane and 500 ml of water was introduced into an autoclave made of stainless steel, the atmospheric oxygen was replaced by nitrogen, the autoclave was sealed and heated to 260° C. The pressure which had risen to 13 kg/cm² was reduced to atmospheric pressure in the course of 1 hour, and at the same time the temperature was increased to 290° C. At this temperature the reaction mixture was stirred in a current of nitrogen for 1½ hours. A transparent polyamide was obtained. RSV = 1.30 dl/g. The second order transition temperature was 192° C. The "mean falling height" (100%) was 20 cm.

b. (according to the invention)

A mixture of 3322 g of terephthalic acid, 1992 g of trans-1,3-bis-(aminomethyl)-cyclohexane, 853 g of trans-1,4-bis-(aminomethyl)-cyclohexane, 1543 g of ε-caprolactam and 800 ml of water was introduced into an autoclave made of stainless steel, the atmospheric oxygen was replaced by nitrogen, the autoclave was sealed and heated to 260° C. The pressure which had risen to 14 kg/cm² was reduced to atmospheric pressure in the course of 1 hour, and at the same time the temperature was increased to 290° C. At this temperature the reaction mixture was stirred in a current of nitrogen for 75 minutes. A transparent polyamide was obtained. RSV = 1.25 dl/g. The second order transition temperature was 143.5° C. The "mean falling height" (50%) was 110 cm.

EXAMPLE 13

According to the polycondensation process described in example 1, a transparent polyamide was prepared from a mixture of 3322 g of terephthalic acid, 1992 g of trans-1,3-bis-(aminomethyl)-cyclohexane, 853 g of trans-1,4-bis-(aminomethyl)-cyclohexane, 1088 g of ε-caprolactam and 800 ml of water. The condensation time (at 290° C) amounted to 60 minutes. RSV = 1.05 dl/g. The second order transition temperature and "mean falling height" (50%) of the product were 150° C and 25 cm, respectively.

What is claimed is:

1. A crystal-clear polyamide consisting essentially of the polymeric condensation product of
    a. 1,3-bis-(aminomethyl)-cyclohexane or a mixture of at least 50 mol % of 1,3-(aminomethyl)-cyclohexane and up to 50 mol % of 1,4-bis-(aminomethyl)-cyclohexane,
    b. terephthalic acid or isophthalic acid or a mixture of terephthalic acid and isophthalic acid, and
    c. at least one aliphatic amino-carboxylic acid containing from 4 to 12 carbon atoms, or at least one lactam of such an acid, the proportion of the amino-carboxylic acid or the lactam being in the range of from 5 to 60% by weight, based on the total weight of the polyamide, said polyamide having a reduced specific viscosity of 1.0 to 2.5 dl/g measured at 25° C. in a solution of one gram of polyamide in 100 ml. of a 60:40 weight ratio mixture of phenol and tetrachloroethane.

2. Crystal-clear polyamide according to claim 1, wherein the diamine component (a) consists of a mixture of from 90 to 60 mol% of 1,3-bis-(amino-methyl)-cyclohexane and of from 10 to 40 mol% of 1,4-bis-(amino-methyl)-cyclohexane.

3. Crystal-clear polyamide according to claim 1, wherein the aliphatic amino-carboxylic acid component (c) is an ω-amino-carboxylic acid.

4. A crystal-clear polyamide according to claim 1 wherein the component (c) is ε-amino-caproic acid or ε-caprolactam.

5. A crystal-clear polyamide consisting essentially of the polymeric condensation product of
   a. 1,3-bis-(aminomethyl)-cyclohexane or a mixture of at least 50 mol % of 1,3-bis-(aminomethyl)-cyclohexane and up to 50 mol % of 1,4-bis-(aminomethyl)-cyclohexane,
   b. terephthalic acid or isophthalic acid or a mixture of terephthalic acid and isophthalic acid, and
   c. at least one aliphatic amino-carboxylic acid containing from 4 to 12 carbon atoms, or at least one lactam of such an acid, the proportion of the amino-carboxylic acid or the lactam being in the range of from 5 to 60% by weight, based on the total weight of the polyamide, said polyamide having a reduced specific viscosity of 1.0 to 1.5 dl/g measured at 25° C. in a solution of one gram of polyamide in 100 ml. of a 60:40 weight ratio mixture of phenol and tetrachloroethane, said polyamide having a second order transition temperature of 116° C. to 154° C.

* * * * *